United States Patent [19]

Livingston et al.

[11] Patent Number: 4,682,025
[45] Date of Patent: Jul. 21, 1987

[54] ACTIVE MIRROR WAVEFRONT SENSOR

[75] Inventors: Peter M. Livingston, Palos Verdes Estates; Jean C. Shelton, Manhattan Beach, both of Calif.

[73] Assignee: TRW Inc., Redondo Beach, Calif.

[21] Appl. No.: 919,542

[22] Filed: Oct. 14, 1986

Related U.S. Application Data

[63] Continuation of Ser. No. 599,871, Apr. 13, 1984, abandoned.

[51] Int. Cl.4 .................... G01J 1/20; G01B 11/00
[52] U.S. Cl. ..................... 250/201; 356/363
[58] Field of Search ............ 250/201 AF, 201 R; 356/354, 359, 363

[56] References Cited

U.S. PATENT DOCUMENTS

| | | | |
|---|---|---|---|
| 4,030,831 | 6/1977 | Gowrinathan | 356/109 |
| 4,295,741 | 10/1981 | Palma et al. | 356/349 |
| 4,346,999 | 8/1982 | Massie | 356/349 |
| 4,355,900 | 10/1982 | Nussmeier | 356/356 |
| 4,493,555 | 1/1985 | Reynolds | 250/201 AF |

FOREIGN PATENT DOCUMENTS 1471386  4/1977  United Kingdom .

Primary Examiner—Gene Wan
Attorney, Agent, or Firm—Noel F. Heal

[57] ABSTRACT

An interferometer, and corresponding method, for use in the measurement and correction of wavefront aberrations in a beam of radiation. The interferometer includes optical elements for generating a reference beam with a known wavefront phase characteristic. The reference beam is recombined with the sample beam, to produce an interference pattern indicative of the phase aberrations in the sample beam as compared with the reference beam. An array of detectors produces electrical signals corresponding to discrete elements of the detected pattern, and an electrical circuit for each elemental detector generates phase correction signals to be applied to a set of movable mirror elements arranged to effect phase changes in the sample beam path. The movable mirror elements adjust the elemental path lengths of the sample beam to yield zero detected phase differences. The mirror elements may be integrated into the interferometer, or may take the form of a deformable mirror used for phase compensation of a light beam. The reference beam in the preferred form of the invention is dithered at a high frequency to minimize the effect of noise, and each electrical circuit includes a synchronous detector to remove the dither-frequency component. In accordance with one disclosed form of the invention, the reference beam is not planar but is aberrated in a conjugate relationship with the radiation beam to be corrected, to provide improved control loop performance.

39 Claims, 7 Drawing Figures

N-VOLTAGE OUTPUTS PROPORTIONAL TO N ABERRATED PHASE SAMPLES

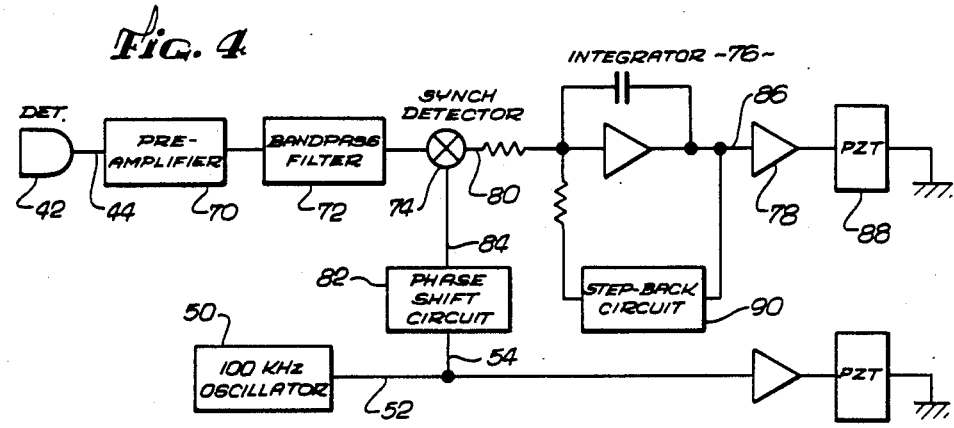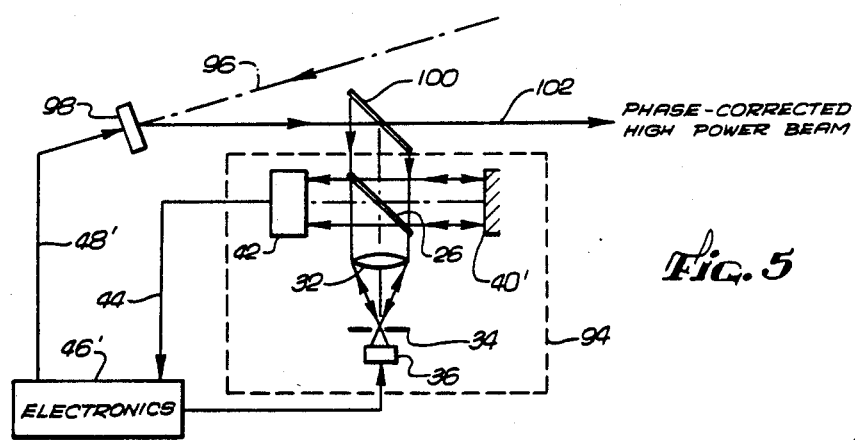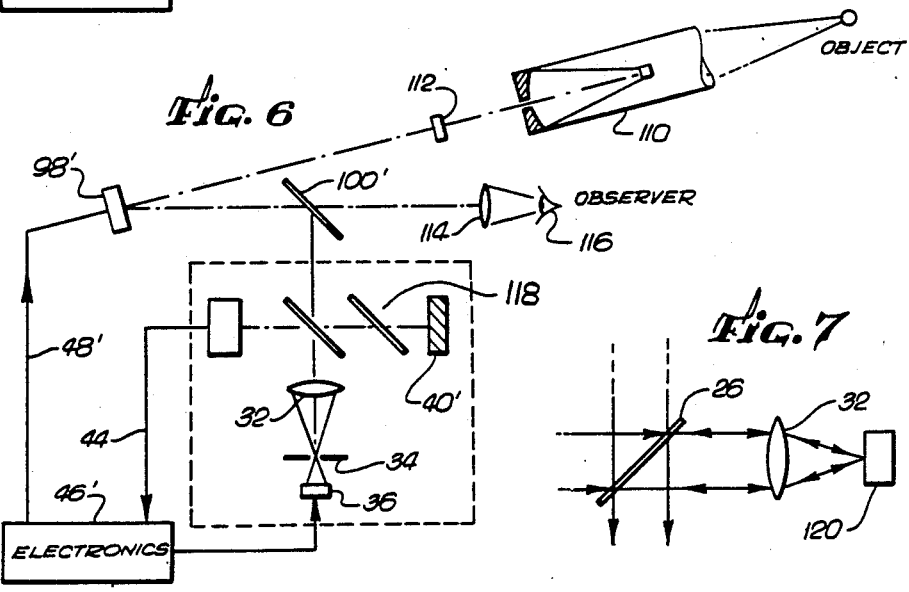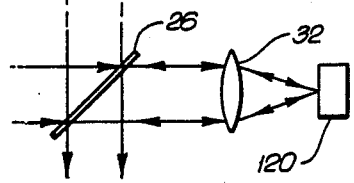

ACTIVE MIRROR WAVEFRONT SENSOR

This application is a continuation of application Ser. No. 599,871, filed 4-13-84, now abandoned.

BACKGROUND OF THE INVENTION

This invention relates generally to active optical systems, and more particularly, to interferometers used in the measurement and compensation of aberrations in optical wavefronts. The term "active optics" applies to optical components whose characteristics are adjusted during actual operation, to control optical wavefronts. The term "optical ray" represents the direction of propagation of radiation, and a "wavefront" is a three-dimensional surface of constant optical path length, orthogonal to a family of rays emanating from a source of radiation. To form an image of a point source of radiation, all rays in the family must have the same optical path length. In a medium of constant refractive index, this is achieved by generating a spherical wavefront, or if the point source is located at infinity, a planar wavefront. Although the geometric concepts of optical rays and wavefronts have no real physical existence, they are invaluable in the design and understanding of optical systems, and will be used in this specification.

The normal function of lenses and mirrors is to adjust optical path lengths to produce desired wavefronts. Although lenses or mirrors can be moved relative to each other to effect changes in an optical system in real time, such as in a zoom lens, there are some wavefront changes that cannot be easily made in this manner. In many applications, a normally spherical or planar wavefront may be subject to variable aberrations. For example, an astronomical telescope receiving light through the atmosphere will be subject to time-varying atmospheric conditions that distort the wavefronts arriving at the telescope. Similarly, light generated by a laser device may be aberrated by variable conditions within a lasing cavity of the device. Accordingly, in any application of optics in which wavefronts are subject to significant time-varying aberrations there is a need to detect such aberrations, and in some cases to compensate for them in real time, i.e. to remove the effects of the aberrations immediately so that the optical system can function continuously as though the aberrations never existed.

Active optical systems have been developed in recent years to provide solutions to problems of this type. Although the field of active optics is relatively new, there have been many publications detailing the work performed in the area. A good survey of the state of the art, as of the year 1978, may be found in a paper by John W. Hardy, "Active Optics: A New Technology for the Control of Light," Proc. of the IEEE, Vol. 66, No. 6, pp. 651-97 June 1978. More recent developments in the field, specifically in wavefront sensing techniques, are described in papers published as the Proceedings of SPIE, the International Society for Optical Engineering, Vol. 351 Wavefront Sensing, August 1982.

Many prior-art active optical systems employ shearing interferometers to obtain a measure of wavefront distortion. Shearing interferometers are a class of instruments in which a wavefront to be measured is divided in amplitude into two components, which are then mutually displaced, and subsequently recombined to produce an interference pattern. In a lateral shear interferometer, the two components are laterally displaced with respect to each other to produce a constant unidirectional shear across the wave front. The resulting interference pattern provides an indication of the slope of the wavefront in the direction of the shear. In a typical lateral shearing system, the wavefront is also sheared in an orthogonal direction, to obtain a measure of the wavefront slopes in the orthogonal direction. Then the slope data in the two orthogonal directions are used to reconstruct the wavefront, usually using digital processing techniques. As noted in the Hardy paper, for a 20×20 array of phase differences approximately 300 simultaneous equations must be solved to reconstruct the wavefront. For large-diameter light beams, wavefront reconstruction poses a significant practical problem in that a computing device of relatively high speed and capacity must be employed for effective real-time wavefront control.

Other types of interferometers used in active optical systems include ac-coupled rotating Ronchi grating interferometers, multidither interferometers, sliding reference interferometers, and ac-coupled Hartmann plate devices. All of these have specific complexities and shortcomings. The basic principles and limitations of multidither interferometers are described in the Hardy paper referred to above. As already mentioned, all of the shearing interferometers suffer bandwidth limitations because of the complexity and computation time involved in wavefront reconstruction. The Hartmann device also has significant alignment difficulties, and any of the devices using rotating elements have an instrinsincly low bandwidth.

Some active optical systems employ an interferometer of the same general type as the Twyman-Green interferometer, which was developed in about 1916 and has been described in many texts on optics. For example, "Principles of Optics" by Max Born and Emil Wolf, Sixth Edition 1980, describes the Twyman-Green interferometer with reference to FIG. 7.41 on page 304. The basic technique of the Twyman-Green instrument is to modify the well-known Michelson interferometer, which splits a light beam into two components with a semireflective mirror, reflects each component from a plane mirror, and then recombines the components to produce an interference pattern. The pattern is dependent on the path lengths followed by light rays in the two components, and one path length may be varied by moving one of the plane mirrors. In the Twyman-Green interferometer, an optical element to be tested, such as a mirror or lens, is inserted in one of the two light paths, and the resulting interference pattern is indicative of the type of aberration suffered by the component being tested.

The Twyman-Green interferometer is used, for example, in a technique proposed in a paper by N. A. Massie et al. entitled "Flow Field Testing with 64 Parallel Channel Heterodyne Interferometer," Proc. of SPIE—The International Society for Optical Engineering, Vol. 351, Wavefront Sensing, pp. 141-47, August 1982. This paper and the others cited in it disclose a device referred to as a heterodyne interferometer. Heterodyne interferometry is a technique in which phase angle differences being measured at a wavefront are carried by a high-frequency "dithering" signal superimposed on the system. The phase angle differences may then be extracted in a synchronous detection step. The principal advantage of heterodyne interferometry is that it is highly insensitive to noise signals that would otherwise distort the accuracy of the phase angle measurements.

In spite of all of these developments, there is still a need for a simple, reliable and fast technique for measuring wavefront distortion, and, in some applications, for compensating for the distortion in real time. Ideally, a wavefront sensor should be less complex than those of the prior art, and should be capable of providing a measure of wavefront distortion without complex numerical computation, to permit application to relatively large light beams. The present invention fulfills this need and provides additional advantages over prior wavefront sensing devices.

SUMMARY OF THE INVENTION

The present invention in its broadest sense resides in a self-contained wavefront sensor capable of providing elemental wavefront phase difference signals over a large area or beam cross section. Briefly, and in general terms, the apparatus of the invention comprises beam splitting means for splitting an input beam into a reference-arm beam and a sample beam, means for generating a non-aberrated reference beam from the reference-arm beam, and means for recombining the sample beam and the reference beam to produce an interference pattern. The invention also includes means for modulating the reference beam with a high-frequency dither signal, multi-element detection means positioned to provide electrical signals indicative of the interference pattern, and multiple electrical circuits connected one to each detection means. Each electrical circuit includes synchronous detector means for removing dither-frequency components, and integration means to provide a phase difference signal. The apparatus also includes elemental deformable mirror means positioned to effect wavefront changes in the sample beam, and means for coupling the phase difference signals to the deformable mirror means. Each element of the deformable mirror means is automatically adjusted to maintain a practically zero phase difference between the sample beam and the reference beam.

Since the device of the invention does not require complex numerical computations to reconstruct the wavefront, there is a significant cost advantage over prior interferometer systems, as well as an important speed advantage that permits the device to handle relatively large light beams without difficulty. Since lateral shearing interferometers need at least two sets of slope measurements, in two orthogonal dimensions, the invention also provides at least a two-to-one advantage in numbers of component parts. Moreover, since the device does not employ frequency multiplexing it is not limited, as are some multidither systems, in the number of mirror actuators it may drive.

In terms of a method of sensing an optical wavefront, the invention comprises the steps of splitting an input beam into a reference-arm beam and a sample beam, generating a non-aberrated reference beam from the reference-arm beam, and combining the sample beam and the reference beam to produce an interference pattern. The method in addition includes modulating the reference signal with a high-frequency dither signal, detecting the interference pattern with multiple detectors, and generating multiple electrical signals indicative of the interference pattern. The remaining steps of the method are synchronously detecting phase difference signals in each of the multiple electrical signals, by removing dither-frequency components, integrating the detected signals to provide phase correction signals, and coupling the phase correction signals to an elemental deformable mirror, whereby each element of the deformable mirror is automatically adjusted to maintain a practically zero phase difference between the sample beam and the reference beam.

In its simplest form, the invention functions as a stand-alone interferometer, providing an array of output signals indicative of the wavefront distortion at elemental areas of an input beam. In one preferred embodiment of the interferometer, the means for generating the reference beam includes a lens for focusing the reference-arm beam, a pinhole spatial filter, and a mirror in the form of a blunt aluminum cone. Light reflected from the mirror passes back through the lens and provides a reference beam with a near-planar wavefront. In this embodiment, the dither signal is applied to the mirror through an electroacoustic transducer.

In the stand-alone interferometer, the sample beam is directed to an array of plane mirrors mounted for independent movement along the axis of the sample beam, using electroacoustic transducers. Each elemental detector is coupled to a corresponding elemental plane mirror through one of the electrical circuits, forming a closed phase-locked loop that automatically forces the phase difference signal to zero by appropriate movements of the mirror. The interferometer accurately tracks aberrations in the input beam and produces a practically constant interference pattern at the detectors. The electrical signals fed back to control the plane mirrors are indicative of the degree of aberration in the input beam, and may be used in controlling the wavefront of the input beam.

The interferometer of the invention may be incorporated into a system for control of a high-power beam, such as a laser beam. For this application, the components of the interferometer are the same as in the stand-alone instrument, except that the movable elemental mirrors are replaced by a single plane mirror. The phase correction signals from the interferometer are fed to a deformable mirror in the path of the input beam, which is then subject to wavefront compensation in accordance with the correction signals generated in the interferometer. A portion of the phase-corrected input beam is sampled with an additional beam splitter and becomes the input beam for the interferometer.

Another aspect of the invention relates to an alternative novel arrangement for the generation of a reference beam in an interferometer. This alternative technique is most usefully employed in conjunction with the control of a high-power laser beam. An amplitude-divided component of the input beam is focused onto a crystal of barium titanate ($BaTiO_3$), which has the property of generating a phase-conjugate return beam. Any wavefront aberrations in the input beam are precisely reflected in the return beam, but with opposite or conjugate phase properties. Use of this return beam as a reference beam results in a phase difference signal twice the one obtained with a planar-wavefront reference beam. In effect, then, the gain and, therefore, the bandwidth of the control loop are doubled by use of the conjugate reference beam. Operation of the instrument is unchanged, however, in that the phased-locked loop tends to drive the phase difference to zero, a condition in which both beams interfering at the detectors have planar wavefronts. Another advantage of the alternative approach is that the power of the reference beam is independent of the amount of distortion in the input beam, and the bandwidth of the control system is doubled.

The interferometer of the invention may also be used as part of an image restoration device, in conjunction with an astronomical telescope, for example. In this arrangement, the interferometer is configured in the same manner as for the high-power beam control application, with a place mirror instead of multiple movable mirrors. Light received in the telescope is reflected from a deformable mirror toward an observer, a portion being sampled to provide the input beam for the interferometer. Phase correction signals from the electrical circuits of the interferometer are fed back to the deformable mirror, which compensates for aberrations in the input beam until a practically flat wavefront is obtained.

It will be appreciated from the foregoing that the present invention represents a significant advance in the field of active optical systems. In particular, the invention provides an ac-coupled heterodyne interferometer of simple but reliable construction, in which elemental portions of a wavefront sampled from an input beam are compared with a reference beam and adjusted to provide a practically planar wavefront, without recourse to complex numerical wavefront reconstruction techniques. The interferometer of the invention can be conveniently incorporated into wavefront compensation apparatus for use in the control of high-power beam sources or for use in real-time image restoration. Other aspects and advantages of the invention will become apparent from the following more detailed description, taken in conjunction with the accompanying drawings.

BRIEF DESCRIPTION OF THE DRAWINGS

FIG. 4 is a schematic diagram of an electrooptical servo circuit used in the wavefront sensor of FIG. 2;

FIG. 5 is a simplified schematic view of a phase conjugation system incorporating the wavefront sensor of the invention in the control of a high-power beam;

FIG. 6 is a simplified schematic view of an image restoration system incorporating the wavefront sensor of the invention; and FIG. 7 is a fragmentary view showing the use of an alternative arrangement for the generation of a reference beam having conjugate aberrations with respect to the input beam.

DESCRIPTION OF THE PREFERRED EMBODIMENT

Figure 1:
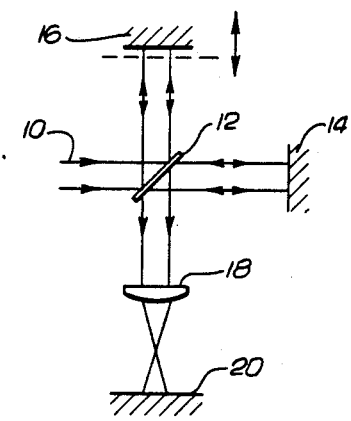
FIG. 1 is a simplified schematic view illustrating the principle of the Michelson interferometer.

As shown in the drawings for purposes of illustration, the present invention is concerned with active optical systems for sensing and compensating for wavefront aberrations. Wavefront sensing, i.e. determining the degree of aberration in a wavefront from a light source, has in the past relied principally on wavefront reconstruction techniques. These techniques require complex numerical computations, typically with digital computing equipment used in association with the wavefront sensing apparatus. These techniques do not lend themselves for use in sensing wavefront aberrations in relatively large-diameter beams, such as those increasingly used or proposed in telescopes and high-power laser systems.

In accordance with the invention, wavefront sensing is performed rapidly and simply by means of a wavefront sensor comprising multiple elemental interferometers of the Michelson type, coupled together in a novel structure. Each elemental interferometer is controlled automatically in such a manner as to vary the phase of a sample beam to correspond with that of a reference beam. Electrical control signals employed to control the elemental interferometers are continuously indicative of the elemental aberrations in the original beam, and may be used to correct the aberrations.

By way of background, a Michelson interferometer is shown in FIG. 1. An input beam, indicated by reference numeral 10, impinges on a semireflective beam splitter 12. One portion of the input beam passes through the beam splitter 12 to a plane reference mirror 14, while the remaining portion is reflected through ninety degrees to a movable plane mirror 16. Some of the light reflected from the reference mirror 14 is again reflected at the beam splitter 12, and passes through a field lens 18 and onto an observation plane 20. Similarly, some of the light reflected from the movable mirror 16 passes through the beam splitter 12, after which it combines with light from the reference mirror 14, and passes through the field lens 18 and onto the observation plane 20. The two beams of light arriving at the observation plane 20 have traversed different optical paths, and in general will have a different relative phase. In the original Michelson interferometer, the mirror 16 could be moved by means of a micrometer screw and the resulting interference fringes in the observation plane 20 can be used to adjust the optical path difference between the arms to zero (white light source) or a multiple of this wavelength (coherent source). The length-comparison aspect of the Michelson interferometer is preserved in the interferometer of the present invention.

Figure 2:
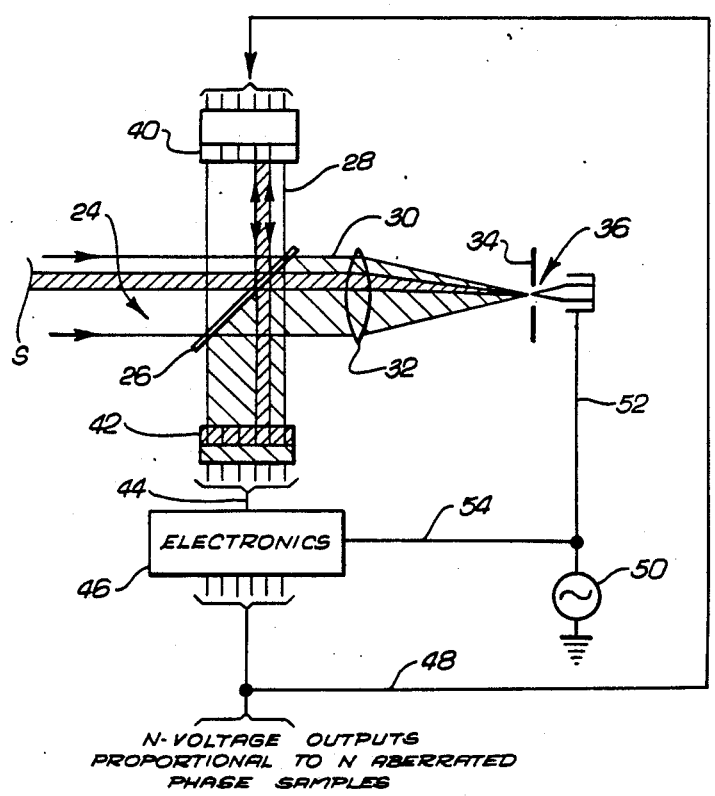
FIG. 2 is a simplified schematic view of an active mirror wavefront sensor in accordance with the invention.

The interferometer of the present invention makes use of the Michelson principle in a novel structure shown in FIG. 2. An input beam 24 impinges on a beam splitter 26 at forty-five degrees, dividing the beam into a sample beam 28 and a reference-arm beam 30. The reference-arm beam 30 is focused by a lens 32 through a pinhole spatial filter 34 and onto a mirror 36. In one embodiment of the invention, the mirror 36 takes the form of the blunt point of a metal cone. The diameter of the mirror is $2.44\lambda F\#$, where $\lambda$ is the wavelength of the light and $F\#$ is the F number of the lens 32. Light reflected back through the spatial filter 34 is aberration-free and appears to emanate from a point source located at an infinite distance. This reflected beam constitutes the reference source, and it has a near-planar wavefront. Another approach to generating the reference beam is to focus the reference-arm beam through a small lens system, such as a microscope objective lens, onto a small plane mirror surface. In any event, the returned reference beam is collimated by the lens 32 and in part reflected by the beam splitter 26 through ninety degrees.

The sample beam 28 is directed onto an array of movable plane mirrors 40, and multiple elemental sample beams are reflected back toward the beam splitter 26, which transmits substantial portions of these beams, for recombination with the reference beam. The elemental sample beams and the reference beam inpinge on a detector array 42, where an interference pattern is produced. Each of the movable mirrors 40 receives a small pencil beam of the sample beam 28, as indicated by the cross-hatched area in FIG. 2. Similarly, the reference beam for a given elemental area may be considered as a small pencil beam, as shown. The detectors 42 are photoelectric transducers that produce corresponding electrical signals on output lines 44, and these are coupled to an electronics module 46, which computes correction signals to be transmitted over lines 48 to the movable mirrors 40.

Each elemental mirror 40 is positioned to compensate for any aberration in the wavefront at a corresponding elemental position of the input beam 24. Therefore, the mirror positioning signals on lines 48 are indicative of the wavefront aberrations for the various elemental areas of the input beam. The instrument shown in FIG. 2 functions as a stand-alone interferometer, providing output signals from lines 48 to indicate the distortion or aberration of the input beam wavefront. As will be further described, the interferometer shown in FIG. 2 can be usefully employed in apparatus for actively compensating for wavefront aberrations.

One remaining and important aspect of the interferometer of FIG. 2 needs to be described. The mirror 36 used in generating the reference beam is also axially movable. A phase dither signal, shown as being derived from a 100 kilohertz (kHz) generator 50, is applied over line 52 to oscillate the mirror 36 along its axial axis, by means of an appropriate piezoelectric transducer. This is the heterodyne aspect of the structure. Because of the dithering of the mirror 36, the reference beam contains frequency components representative of the sum of and the difference between the input beam frequency and the dither frequency. As will shortly be described, the dither component is removed in the electronics module by means of a synchronous detection step, employing an electrical dither signal transmitted to the module from the generator 50, over line 54. The principal advantage of heterodyne operation of the interferometer is that the aberration signals are effectively modulated onto a dither-frequency carrier, and the system is inherently insensitive to noise.

Figure 3:
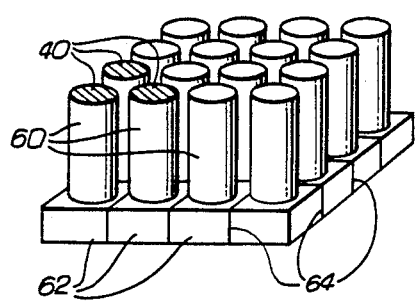
FIG. 3 is a perspective view of a multielement movable mirror of the type used in the wavefront sensor of FIG. 2.

FIG. 3 shows a typical construction for the array of movable mirrors 40. Each mirror 40 is mounted on a stack 60 of piezoelectric transducers, which are connected electrically in parallel. The wafers have the property that they expand in one dimensional direction in response to the application of voltage. Since the wafers are stacked mechanically in series, the voltage-induced deformations are cumulative, and the mirrors can be moved axially over a significant distance. Each stack 60 is mounted on an angularly adjustable mount 62, and the mounts are separated from each other by air gaps 64. The mounts 62 may also include a material for acoustic insulation.

FIG. 4 shows for one elemental channel the components of the electronics module 46. The components include a preamplifier 70, a bandpass filter 72, a synchronous detector 74, an integrator circuit 76, and an amplifier 78 to drive the corresponding movable mirror 40. Electrical signals obtained from the detector 42 are first amplified in the preamplifier 70, and then filtered in the bandpass filter 72 to remove low-frequency noise components. The next step is that of synchronous detection, in which the input signals are combined with a synchronous dither-frequency signal, to obtain an output signal, on line 80 from the detector, that is proportional to the detected phase difference between the sample and reference beams at the particular sample location. The dither-frequency signal is derived from the oscillator 50, through a variable phase-shift circuit 82, which is used for calibration purposes and transmits the dither-frequency signal over line 84 to the detector 74.

The integrator circuit produces a phase correction signal on line 86 to the amplifier 78, the output of which is coupled to a piezoelectric transducer 88 used to produce axial movement of the corresponding movable mirror 40. The presence of the integrator circuit 76 results in a mirror movement of which the speed is proportional to the phase error signal on line 80. The servo circuit illustrated is a so-called hill-climbing servoloop. It will rapidly lock the phases of the two interfering beams and generate appropriate correction signals to keep the sample beam locked in phase with the reference beam. The correction signal at any instant in time is indicative of the phase aberration in the input beam at the location of a particular elemental interferometer.

The signal transmitted to the integrator 76 over line 80 is proportional to the phase difference between the reference and sample beam at he elemental sample location. That is:

$$V_{synch} = K\theta. \tag{1}$$

where $\theta$ is the phase difference in radians, and K is the synchronous detector gain factor, and can be expressed as:

$$K = 8/\pi [J_1(a) \nu R_L A_d (I_{REF} I_{SIG})^{\frac{1}{2}} \pi G/RC]. \tag{2}$$

where:
 $J_1$ = Bessel function of the first kind (=0.53 for a=1.83),
 a = dither amplitude in optical radians,
 $\nu$ = detector responsivity (amps/watt),
 $R_L$ = detector load resistance,
 $A_d$ = sampled wavefront area (cm$^2$),
 $I_{REF}$ = reference beam intensity (watts/cm$^2$),
 $I_{SIG}$ = sample beam intensity (watts/cm$^2$),
 $\pi$ = piezoelectric extension factor (radians/volt),
 G = circuit gain, exclusive of detector transimpedance, and
 RC = integrator time constant (seconds)

It will be apparent from this expression that the loop gain factor is dependent on the root product of the sample beam and reference beam intensities.

Since the speed of the mirror movement is controlled to correspond with the detected phase error, and since each mirror has only limited movement capability, the servo circuitry must also include a step-back circuit 90 operating in conjunction with the integrator circuit 76. When the step-back circuit senses that the displacement signal applied to the mirror 40 is such as to take the mirror to the end of its travel, an offset is signal is subtracted from the displacement signal, to move the mirror back within its travel range by an integral number of wavelengths. The detectors 42 measure phase differences less than a full wavelength. Sudden movement of a mirror 40 by an integral number of wavelengths therefore has only a momentary effect on the control servo circuit.

The interferometer shown in FIG. 2 may need to be calibrated by providing an input beam of known wavefront quality, and adjusting each electrical circuit until a desired interference pattern is obtained. The frequency of recalibration will depend on the nature of the application. For metrology purposes, of course, frequency calibration may be needed.

FIG. 5 shows how the interferometer of FIG. 2, the optical elements of which are referred to by numeral 94, can be incorporated into a system for wavefront compensation of a high-power beam. The elements of the interferometer 94 are basically the same as those shown in FIG. 2, except that the movable mirrors 40 are replaced by a single fixed plane mirror 40'. A beam 96 subject to wavefront aberration is directed onto a deformable mirror 98, from which it is reflected toward a sampling beam splitter 100. Most of the power of the beam is transmitted through the beam splitter 100 and proceeds as a phase-corrected beam 102, but a sample is reflected and forms the input beam of the interferometer 94. The electronics module 46' generates phase correction signals, which are transmitted over line 48' to the deformable mirror 98, which applies elemental wavefront corrections to the beam 96, to bring into conformance with the wavefront of the reference beam of the interferometer 94.

The deformable mirror 98 has multiple reflective elements, each individually movable by its own transducer. Itek Optical Systems of Lexington, Mass., manufactures a suitable mirror designated the MPM (monolithic piezoelectric mirror), with a diameter up to 10 cm and up to 350 mirror elements.

A similar configuration to FIG. 5 is shown in FIG. 6 for use in conjunction with an input telescope 110. Light received in the telescope 110 is filtered in a narrow-band filter 112, then directed onto a deformable mirror 98'. Most of the remaining components are identical to those shown in FIG. 5, except that the phase-corrected beam is passed through a lens system 114 and then to an observer's eye, as indicated at 116. The only other difference is that the interferometer 94 also includes a compensating wedge 118 between the beam splitter 26 and the plane mirror 40'.

FIG. 7 shows an alternative approach to the generation of a reference beam. As previously discussed, the reference beam ideally has a planar wavefront, which is compared in phase with the sample beam wavefront at each elemental point that is sampled. One disadvantage to the self-referencing scheme shown in FIG. 2 is that the power of the resulting reference beam is significantly reduced if there are large aberrations in the input beam. The lower power reference beam results in a lower loop gain for the control system, as indicated by the gain expression above (2). In the alternative approach to the generation of a reference beam, a planar wavefront is not generated at all. Instead the reference beam is aberrated to the same degree as the input beam but in a conjugate or opposite sense. Such a conjugate beam can be obtained if the reference-arm beam is focused onto a crystal of appropriately oriented barium titanate ($BaTiO_3$), indicated diagrammatically at 120, which has the property of generating an internally reflected beam that is the conjugate in phase aberration to the incident beam.

Since the reference beam is the phase conjugate of the sample beam, the phase difference signals obtained are double those in the planar reference wavefront case. The phase errors are still driven rapidly toward zero by operation of the servo circuitry described, but the gain and the bandwidth of the servo loop are doubled, with a corresponding improvement in performance. This approach is suited for use in the phase correction of high-power beams, i.e. the FIG. 5 configuration. However, oscillation of the $BaTiO_3$ crystal at the dither frequency poses a reliability problem, and the FIG. 5 configuration should therefore be modified to apply the dither signal in some other manner, such as by oscillating a different optical component.

It will be appreciated from the foregoing that the present invention represents a significant advance in the field of active optics. In particular, the invention provides a simple but effective interferometer for measuring the degree of wavefront aberration without the need for complex and costly numerical computation equipment for wavefront reconstruction. Furthermore, the interferometer of the invention may be used in conjunction with apparatus for phase correction of wavefronts, whether in locally generated high-power beams or in received beams of light from a telescope. it will also be appreciated that, although several embodiments of the invention have been described in detail for purposes of illustration, various modifications may be made without departing from the spirit and scope of the invention. Accordingly, the invention is not to be limited except as by the appended claims.

I claim:

1. An active mirror wavefront sensor, comprising:
   beam splitting means for splitting an input beam into a reference-arm beam and a sample beam;
   means for generating a reference beam from the reference-arm beam;
   means for modulating the reference beam with a high-frequency dither signal;
   means for recombining the sample beam and the reference beam to produce an interference pattern;
   multi-element detection means positioned to provide electrical signals indicative of the interference pattern;
   multiple electrical circuits connected one to each element of the detection means, and each including synchronous detector means for removing dither-frequency components from the electrical signals, and means to provide a phase correction signal from the electrical signals;
   elemental deformable mirror means positioned to effect wavefront changes in the sample beam; and
   means for coupling the phase correction signals to the deformable mirror means, whereby each element of the deformable mirror means is automatically adjusted to maintain a practically zero phase difference between the sample beam and the reference beam.

2. An active mirror wavefront sensor as set forth in claim 1, wherein:
   the deformable mirror means is positioned to reflect the sample beam back to the beam splitting means;
   the means for generating a reference beam includes a mirror that reflects the reference beam back toward the beam splitting means; and
   the beam splitting means also functions as the means for recombining the reference and sample beams.

3. An active mirror wavefront sensor as set forth in claim 2, wherein the means for modulating the reference beam with a dither signal includes:
   a dither frequency signal generator; and
   electroacoustic transducer means coupled to the dither frequency signal generator, for oscillating the mirror used to generate the reference beam.

4. An active mirror wavefront sensor for detecting wavefront aberrations in an input beam, the sensor comprising:
- means for obtaining a sample beam from the input beam;
- a movable mirror array for dividing the sample beam into elemental sample beam zones;
- means for generating a reference beam from the input beam;
- means for combining each of the elemental sample beam zones with the reference beam to produce a corresponding array of interference pattern elements;
- a detector array positioned to sense the interference pattern elements and generate corresponding phase difference signals indicative of phase differences at the detector array; and
- electrical circuit means for generating mirror position correction signals from the phase difference signals, and coupling the correction signals to the movable mirror array, whereby each mirror in the array is automatically adjusted to maintain a practically zero phase difference between each elemental sample beam zone and the reference beam, and the correction signals provide an indication of the degree of phase aberration in the input beam.

5. An active mirror wavefront sensor as set forth in claim 4, wherein the means for generating a reference beam from the input beam includes:
- a beam splitter for obtaining a reference portion of the input beam;
- a lens for focusing the reference portion of the beam;
- a pinhole spatial filter through which the reference portion of the beam is passed; and
- a mirror for reflecting some of the reference portion of the beam back through the pinhole spatial filter as a reference beam of practically planar wavefront.

6. An active mirror wavefront sensor as set forth in claim 5, wherein:
- the means for generating a reference beam further includes a collimating lens for collimating the reference portion of the beam after it emerges from the spatial filter; and
- the mirror for reflecting the reference portion of the beam is a plane mirror.

7. An active mirror wavefront sensor as set forth in claim 5, wherein:
- the sensor further includes a dither frequency generator and means for applying axial movement to the mirror in means for generating the reference beam, at the dither frequency; and
- the electrical circuit means includes synchronous detector means, to demodulate the phase difference signals, and integration means to generate the phase correction signals as the time integral of the demodulated phase difference signals.

8. An active mirror wavefront sensor as set forth in claim 6, wherein:
- the sensor further includes a dither frequency generator and means for applying axial movement at the dither frequency to the mirror in the means for generating the reference beam; and
- the electrical circuit means includes synchronous detector means, to demodulate the phase difference signals, and integration means to generate the phase correction signals as the time integral of the demodulated phase difference signals.

9. An active mirror wavefront sensor as set forth in claim 4, wherein the means for generating a reference beam from the input beam includes:
- a beam splitter for obtaining a reference portion of the input beam;
- a lens for focusing the reference portion of the beam;
- a crystal of barium titanate disposed in the path of the focused portion of the reference portion of the beam, to produce a return reference beam that has conjugate phase aberration in relation to the input beam, whereby the phase difference signals will be twice those obtained using a planar reference beam.

10. An active mirror wavefront sensor as set forth in claim 4, wherein:
- the sensor further includes means for heterodyning the reference beam at a dither frequency; and
- means within the electrical circuit means, for synchronously detecting the phase difference signals.

11. An active mirror wavefront sensor, comprising:
- beam splitting means for splitting an input beam into a reference-arm beam and a sample beam;
- means for generating a reference beam from the reference-arm beam, including a pinhole spatial filter and a retro mirror for reflecting the reference beam back through the filter to the beam splitting means;
- an array of axially movable mirrors positioned in the path of the sampel beam, to reflect the sample beam back to the beam splitting means as multiple elemental sample beams, wherein the beam splitting means also functions to recombine the elemental sample beams and the reference beam to produce an interference pattern;
- means for oscillating the retro mirror, to modulate the reference beam with a high-frequency dither signal;
- multi-element detection means positioned to receive the recombined elemental sample beams and the reference beam, and to provide electrical signals indicative of the resulting interference pattern;
- multiple electrical circuits connected one to each detection means, and each including synchronous detector means for removing dither-frequency components, and means to provide a phase correction signal from the electrical signals; and
- means for coupling the phase correction signals to the array of movable mirrors, whereby each movable mirror is automatically adjusted to maintain a practically zero phase difference between the corresponding elemental sample beam and the reference beam.

12. Apparatus for compensating for wavefront distortion in an aberrated radiation beam, comprising:
- a multi-element deformable optical device capable of effecting elemental phase changes in the wavefront of the aberrated beam;
- a beam sampler for obtaining a sample beam from the aberrated beam after it emerges from the deformable optical device; and
- a wavefront sensing interferometer for receiving the sample beam and deriving from it electrical signals indicative of elemental phase differences between elemental sample beams and a planar reference beam wavefront, for coupling to the deformable optical device to compensate for the wavefront distortion in the aberrated beam, wherein the wavefront sensing interferometer includes means for generating a reference beam from the sample beam, means for combining the reference beam with elemental portions of the sample beam to produce an interference pattern indicative of phase aberrations in the sample beam, means for applying a dither-frequency component to the reference beam, an array of elemental detectors positioned to be responsive to the interference pattern and to generate elemental phase difference signals, and electrical means for generating phase correction signals from the phase difference signals for application to the deformable optical device, whereby each elemental sample beam has its wavefront phase corrected and the entire aberrated beam is thereby corrected for wavefront aberration.

13. Apparatus as set forth in claim 12, wherein the means for generating a reference beam from the sample beam includes:

a beam splitter for obtaining a reference portion of the sample beam;

a lens for focusing the reference portion of the beam;

a pinhole spatial filter through which the reference portion of the beam is passed; and a mirror for reflecting some of the reference portion of the beam back through the pinhole spatial filter as a reference beam of practically planar wavefront.

14. Apparatus as set forth in claim 13, wherein:

the means for generating a reference beam further includes a lens for collimating the reference portion of the beam after it emerges from the spatial filter; and the mirror for reflecting the reference portion of the beam is a plane mirror.

15. Apparatus as set forth in claim 13, wherein:

the means for applying a dither frequency component to the reference beam includes a dither frequency generator and means for applying axial movement at the dither frequency to the mirror included in the means for generating the reference beam; and the electrical means includes synchronous detector means, to demodulate the phase difference signals, and integration means to generate the phase correction signals as the time integral of the phase difference signals.

16. Apparatus as set forth in claim 14, wherein:

the means for applying a dither-frequency component to the reference beam inludes a dither frequency generator and means for applying axial movement at the dither frequency to the mirror included in the means for generating the reference beam; and the electrical means includes synchronous detector means, to demodulate the phase difference signals, and integration means to generate the phase correction signals as the time integral of the demodulated phase difference signals.

17. Apparatus as set forth in claim 12, wherein the means for generating a reference beam from the sample beam includes:

a beam splitter for obtaining a reference portion of the sample beam;

a lens for focusing the reference portion of the beam; and a crystal of barium tantalate disposed in the path of the focused reference portion of the beam, to produce a return reference beam that has conjugate phase aberration in relation to the sample beam, whereby the phase difference signals will be twice those obtained using a planar reference beam.

18. Apparatus as set forth in claim 12, wherein:

the deformable optical device is a multi-element mirror; and the aberrated beam is a laser beam.

19. Apparatus as set forth in claim 12, wherein:

the deformable optical device is a multi-element mirror; and the aberrated beam is derived from light received in a telescope.

20. Apparatus as set forth in claim 12, werein:

the means for generating a reference beam from the sample beam includes a beam splitting semireflective mirror;

the means for combining the reference beam and elemental sample beam includes a plane mirror positioned to reflect elemental sample beams received from the semireflective mirror back to the semireflective mirror, and also includes the same semireflective mirror, which functions to reflect the reference beam and to transmit the sample beams reflected from the plane mirror, thereby combining the reference and sample beams; and the array of elemental detectors is positioned to receive the interfering sample and reference beams from the semireflective mirror.

21. A method of sensing an optical wavefront, comprising the steps of:

splitting an input beam into a reference-arm beam and a sample beam;

generating a reference beam from the reference-arm beam;

modulating the reference beam with a high-frequency dither signal;

combining the sample beam and the reference beam to produce an interference pattern;

detecting the interference pattern with multiple detectors and generating multiple electrical signals indicative of the interference pattern;

synchronously detecting phase difference signals in each of the multiple electrical signals, by removing dither-frequency components;

integrating the detected signals to provide phase correction signals; and applying the phase correction signals to an elemental deformable mirror, whereby each element of the deformable mirror is automatically adjusted to maintain a practically zero phase difference between the sample beam and the reference beam.

22. A method as set forth in claim 21, wherein:

the elemental deformable mirror is located within an interferometer instrument, and the phase correction signals provide a measure of aberration of the input beam.

23. A method as set forth in claim 21, wherein:

the elemental deformable mirror is located in the path of an aberrated beam to be phase-corrected; and the method further includes the step of sampling the aberrated beam to be phase compensated, after reflection from the deformable mirror, to obtain the input beam, whereby the input beam and the sample beam are phase-compensated and the phase differences between the reference beam and the aberrated beam are forced to zero.

24. An active mirror wavefront sensor, comprising:

means for generating a reference beam and a sample beam from an input beam;

means for modulating the reference beam with a high-frequency dither signal;

means for combining the reference beam and the sample beam to produce an interference pattern;

multi-element detection means positioned to provide electrical signals indicative of the interference pattern;

elemental deformable mirror means positioned to effect wavefront changes in the sample beam; and multiple electrical circuits connected one to each element of the detection means, to derive phase correction signals from the electrical signals, and coupled to corresponding ones of the elemental deformable mirror means, whereby each element of the deformable mirror means is automatically adjusted to maintain a practically zero phase difference between the sample beam and the reference beam, and whereby the phase correction signals coupled to the deformable mirror means are indicative of the wavefront aberration of the input beam.

25. A method of sensing an optical wavefront, comprising the steps of:

deriving a sample beam and a reference beam from an input beam;

combining the sample beam and the reference beam to produce an interference pattern;

modulating the reference beam with a high-frequency dither signal;

detecting the interference pattern with multiple detectors and generating multiple electrical signals indicative of the interference pattern;

deriving multiple phase difference signals from the multiple electrical signals; and applying the phase correction signals to an elemental deformable mirror, whereby each element of the deformable mirror is automatically adjusted to maintain a practically zero phase difference between the sample beam and the reference beam, and whereby the phase correction signals are indicative of the degree of aberration of the wavefront of the sample beam.

26. An active mirror wavefront sensor, comprising:

beam splitting means for splitting an input beam into a reference-arm beam and a sample beam;

means for generating a reference beam from the reference-arm beam;

means for modulating the reference beam with an oscillatory dither signal;

means for recombining the sample beam and the reference beam to produce an interference pattern;

multi-element detection means positioned to provide electrical signals indicative of the interference pattern;

electrical circuitry connected the detection means, and including synchronous detector means for removing dither-frequency components from the electrical signals, and means to provide a phase correction signal from the electrical signals;

deformable mirror means positioned to effect wavefront changes in the sample beam; and means for coupling the phase correction signals to the deformable mirror means, whereby the deformable mirror means is automatically adjusted to maintain a practically zero phase difference between the sample beam and the reference beam.

27. An active mirror wavefront sensor, as set forth in claim 26, wherein:

the deformable mirror means is positioned to reflect the sample beam back to the beam splitting means;

the means for generating a reference beam includes a mirror that reflects the reference beam back toward the beam splitting means; and the beam splitting means also functions as the means for recombining the reference and sample beams.

28. An active mirror wavefront sensor as set forth in claim 27, wherein the means for modulating the reference beams with a dither signal includes:

a dither frequency signal generator; and electroacoustic transducer means coupled to the dither frequency signal generator, for oscillating the mirror used to generated the reference beam.

29. An active mirror wavefront sensor for detecting wavefront aberrations in an input beam, the sensor comprising:

means for obtaining a sample beam from the input beam;

a deformable mirror for producing from the sample beam an adjusted-wavefront sample beam;

means for generating a reference beam from the sample beam;

means for combining the adjusted-wavefront sample beam with the reference beam to produce an interference pattern;

a detector array positioned to sense the interference pattern and generated corresponding phase difference signals indicative of phase differences in the interference pattern; and electrical circuit means for generating mirror position correction signals from the phase difference signls, and coupling the correction signals to the deformable mirror, whereby the deformable mirror is automatically adjusted to maintain a practically zero phase difference between the reference beam and the sample beam, and the correction signals provide and indication of phase aberration in the input beam.

30. An active mirror wavefront sensor as set forth in claim 29, wherein the means for generating a reference beam from the input beam includes:

a beam splitter for obtaining a reference portion of the input beam;

a lens for focusing the reference portion of the beam; and a mirror for reflecting at least some of the reference portion of the input beam as a reference beam of practically planar wavefront.

31. An active mirror wavefront sensor as set forth in claim 30, wherein:

the mirror for reflecting at least some of the reference portion is a plane mirror; and the means for generating a reference beam further includes a collimating lens.

32. An active mirror wavefront sensor as set forth in claim 31, wherein:

the sensor further includes a dither frequency generator and means for applying axial movement to the mirror in the means for generating the reference beam, at the dither frequency; and the electrical circuit means includes synchronous detector means, to demodulate the phase difference signals, and integration means to generate the phase correction signals as the time integral of the demodulated phase difference signals.

33. An active mirror wavefront sensor as set forth in claim 30, wherein:

the sensor further includes a dither frequency generator and means for applying axial movement to the mirror in the means for generating the reference bean, at the dither frequency; and the electrical circuit means includes synchronous detector means, to demodulate the phase difference signals, and integration means to generate the phase correction signals as the time integral of the demodulated phase difference signals.

34. An active mirror wavefront sensor as set forth in claim 29, wherein the means for generating a reference beam from the input beam includes:

a beam splitter for obtaining a reference portion of the input beam;

a lens for focusing the reference portion of the beam; and means for producing a phase-conjugate return reference beam, whereby the return reference beam will have phase-conjugated aberrations in relation to the input beam, and the phase difference signals will be twice those obtained using a planar reference beam.

35. An active mirror wavefront sensor as set forth in claim 34, wherein:

the means for producing a phase-conjugate return reference beam inludes a crystal of barium titanate disposed in the path of the focused reference portion of the input beam.

36. An active mirror wavefront sensor as set forth in claim 29, wherein:

the sensor further includes means for heterodyning the reference beam at a dither frequency; and means withing the electrical circuit means, for synchronously detecting the phase difference signals.

37. A method of sensing an optical wavefront, comprising the steps of:

generating a sample beam from an input beam;

generating a reference beam from the same input beam;

modulating the reference beam with an oscillatory dither signal;

combining the sample beam and the reference beam to produce an interference pattern;

detecting the interference pattern with multiple detectors and generating multiple electrical signals indicative of the interference pattern;

synchronously detecting phase difference signals in each of the multiple electrical signals, by removing dither-frequency components;

integrating the detected signals to provide phase correction signals; and applying the phase correction signals to a deformable mirror, whereby the deformable mirror is automatically adjusted to maintain a practically zero phase difference between the sample beam and the reference beam.

38. An active mirror wavefront sensor, comprising:

means for generating a reference beam and a sample beam from an input beam;

means for modulating the reference beam with an oscillatory dither signal;

means for combining the reference beam and the sample beam to produce an interference pattern;

multi-element detection means positioned to provide electrical signals indicative of the interference pattern;

deformable mirror means positioned to effect wavefront changes in the sample beam; and electrical circuit means connected to the detection means, to derive phase correction signals from the electrical signals, and coupled to the deformable mirror means, whereby the deformable mirror means is automatically adjusted to maintain a practically zero phase difference between the sample beam and the reference beam, and whereby the phase correction signals coupled to the deformable mirror means are indicative of the wavefront aberration of the input beam.

39. A method of sensing an optical wavefront, comprising the steps of:

deriving a sample beam and a reference beam from an input beam;

combining the sample beam and the reference beam to produce an interference pattern;

modulating the reference beam with an oscillatory dither signal;

detecting the interference pattern with multiple detectors and generating electrical signals indicative of the interference pattern;

deriving multiple phase difference signals from the electrical signals; and applying the phase correction signals to a deformable mirror, whereby the deformable mirror is automatically adjusted to maintain a practically zero phase difference between the sample beam and the reference beam, and whereby the phase correction signals are indicative of the degree of aberration of the wavefront of the sample beam.

* * * * *